United States Patent
Kretsinger

(10) Patent No.: US 7,167,699 B1
(45) Date of Patent: Jan. 23, 2007

(54) METHOD FOR TRACKING WIRELESS TELEPHONE MINUTES USED AND PROVIDING AN ALERT

(75) Inventor: Matthew R. Kretsinger, Fenton, MO (US)

(73) Assignee: Minute Guard, L.L.C., St. Louis, MO (US)

( * ) Notice: Subject to any disclaimer, the term of this patent is extended or adjusted under 35 U.S.C. 154(b) by 118 days.

(21) Appl. No.: 10/988,863

(22) Filed: Nov. 15, 2004

(51) Int. Cl.
*H04M 11/00* (2006.01)

(52) U.S. Cl. ............... 455/405; 455/408; 455/407; 455/418; 370/235; 370/395.21; 379/114.27; 379/114.28

(58) Field of Classification Search .......... 455/405, 455/408, 407, 418; 370/235, 395.21; 379/114.27, 379/114.28
See application file for complete search history.

(56) References Cited

U.S. PATENT DOCUMENTS

| | | | |
|---|---|---|---|
| 6,321,078 B1 | 11/2001 | Menelli et al. | 455/407 |
| 6,493,547 B1 | 12/2002 | Raith | 455/405 |
| 2002/0154751 A1 | 10/2002 | Thompson, III et al. | 379/114.01 |
| 2003/0050044 A1 | 3/2003 | Awada et al. | 455/407 |
| 2003/0110044 A1 | 6/2003 | Nix et al. | 705/1 |
| 2003/0193960 A1 | 10/2003 | Land | 370/401 |
| 2003/0220093 A1 | 11/2003 | Fellenstein et al. | 455/405 |
| 2005/0037731 A1* | 2/2005 | Whewell et al. | 455/406 |
| 2005/0105467 A1* | 5/2005 | True et al. | 370/235 |
| 2005/0107065 A1* | 5/2005 | Bernhart | 455/405 |

* cited by examiner

*Primary Examiner*—Danh C. Le
(74) *Attorney, Agent, or Firm*—Grace J. Fishel

(57) ABSTRACT

A method for tracking allotted wireless telephone minutes used and providing an alert before overage charges are accrued. Information about allotted minutes used and days to refresh are obtained from a user's wireless telephone service provider on a periodic basis, such as daily. E-mail or text message reports are provided to the user on such basis as requested by the user and/or to an account administrator.

12 Claims, 5 Drawing Sheets

| User | Minutes Used | Minute Allowance | Days Remaining |
|---|---|---|---|
| *John | 800 | 900 | 5 |
| Jane | 500 | 600 | 10 |
| *User is over 75% of their Minute Allowance ||||

METHOD FOR TRACKING WIRELESS TELEPHONE MINUTES USED AND PROVIDING AN ALERT

BACKGROUND OF THE INVENTION

1. Field of the Invention

The present invention relates to a method for tracking allotted wireless telephone minutes used and alerting an individual user or an account administrator before overage charges are accrued.

2. Brief Description of the Prior Art

Telecommunication service providers typically offer service plans with metered peak minutes during high weekly usage periods and unlimited off-peak minutes during low usage weekly periods to level the distribution of available bandwidth over the time period. Other plans offer metered anytime wireless telephone minutes. In packaged, wireless service plans the fees for excess usage are extremely high. It is therefore very important to many users that they have current information about their metered call minutes. In the absence of such information, individual users can roll up hundreds of dollars and businesses thousands of dollars in unexpected and unwanted excess fees each month.

Some wireless phones are outfitted with timers but they do not account for the "minute rounding" applied by the service provider. For example, if the call duration is one minute and fifteen seconds, the service provider will debit the user's account for two minutes, the industry standard being one-minute rounding. In addition, the user must remember to activate the timer for each call, whether incoming or outgoing, as the user is charged for both, and distinguish between whether the call is during peak or off-peak times.

Many telecommunication service providers offer a web-based lookup system for monitoring allotted minutes that have been used and/or provide a call feature that connects to an automated customer support desk which provides account information from an accounting database. Both systems require the user to be proactive in keeping track of minutes used. In addition, the call to the service provider may result in additional wireless charges. Service providers have little or no incentive to alert the user of impending overage charges because they are very profitable. In addition, individual usage is sometimes inconsistent. A user with overage charges one month may upgrade to a more expensive plan, with more minutes than are actually needed based on average needs, which also benefits the service provider.

Businesses often purchase or lease large numbers of wireless phones for use by their employees. Typically the phones are on service plans from different service providers because of regional differences in cellular telephone coverage. Controlling, or at least monitoring employee usage of the wireless phones is important for controlling business expenses but administrative costs are high. Existing management techniques are generally manual and involve one or more employees evaluating the invoices. Calling the various service providers to monitor allotted minutes used for each telephone on a current basis is simply not feasible with a fleet of phones because the labor costs would likely wipe out whatever management benefit might be obtained. Like the service providers, individual employees may have little incentive to avoid overage charges since it is difficult for the employer to detect or keep track of excessive use.

BRIEF SUMMARY OF THE INVENTION

In view of the above, it is an object of the present invention to provide a method for tracking wireless telephone minutes used and proactively alerting the user. It is another object to provide a personal and business management tool for averting overage charges. It is also an object to provide a management tool for maximizing the use of allotted minutes while avoiding overage charges. Other objects and features of the invention will be in part apparent and in part pointed out hereinafter.

In accordance with the invention, a method is provided for alerting a user and/or an account administrator before overage wireless telephone charges are accrued. The user and/or account administrator are provided with an alert by e-mail, text messaging or both as requested.

An identifying number is assigned to each user and to each member. A plurality of users may be associated with each member, for example members of a family or employees of a business or other organization. The number of minutes allotted under each user's wireless telephone plan, wireless telephone number, wireless service provider, log-in name and password are obtained from each user.

Periodic queries are sent to each user's service provider regarding metered usage minutes used and days until the minutes refresh under the user's telephone plan. Reports are sent by e-mail or text messaging to the user and/or an administrator of the member on a basis selected by the user. Three basis are typically offered: Daily, on reaching pre-designated barrier minutes and never. Never may be selected for reports in the case of an administrator where the user and member are the same person to avoid duplicate reports.

It has been found that setting the barrier minutes triggering a report at 75%, 80%, 90% and 100% of usage minutes allotted provides adequate notice and is preferred by most users and administrators. The method may provide earlier notification or daily reports, however, if requested by either the user or administrator.

The invention summarized above comprises the methods hereinafter described, the scope of the invention being indicated by the subjoined claims.

BRIEF DESCRIPTION OF THE SEVERAL VIEWS OF THE DRAWING

In the accompanying drawings, in which one of various possible embodiments of the invention is illustrated, corresponding reference characters refer to corresponding parts throughout the several views of the drawings in which.

DETAILED DESCRIPTION OF THE INVENTION

The present invention provides a method for watching a user's wireless telephone minutes and alerting him or her via a text message and/or e-mail with updates. Each user is registered to a member account. More than one user may be registered to a member account such as individuals in a family or employees of a business. Alerts may be sent to both the user and to the administrator of the member account. The object of the method is to alert the user and/or administrator before overage charges are accrued. Once overage charges are accrued, daily reminders may be sent.

FIGS. 1–4 are flowcharts illustrating exemplary operations according to various aspects of the present invention. It will be understood that blocks of the flowcharts, and combinations of the blocks in the flowcharts, can be implemented by computer program instructions which may be loaded and executed on a computer or other programmable data process apparatus. It will also be understood that each block of the flowcharts and combinations of blocks therein can be implemented by special purpose hardware-based computer systems which perform the specified functions or steps, or combinations of special purpose hardware and computer instructions.

Figure 1:
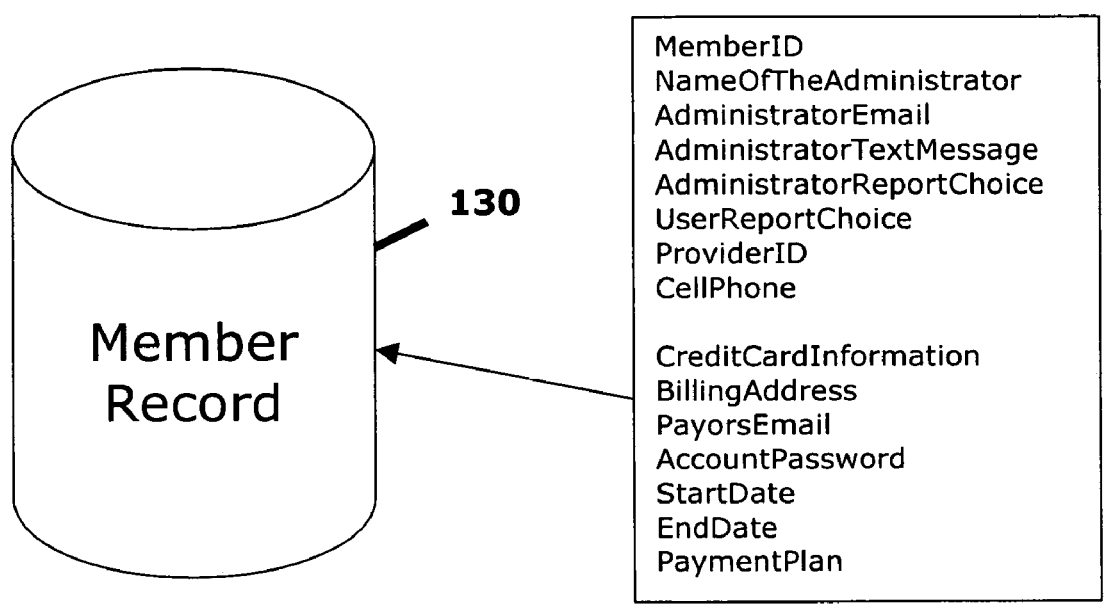
FIG. 1 is a simplified diagram of fields in a member's record in accordance with the present invention.

Referring first to FIG. 1, information for a member record is displayed. Important information includes the following fields:

MemberID A unique member ID assigned to each member by the system. A member may be an individual or an organization such as a family, business or the like.

NameOfTheAdministrator When the member is an individual the administrator will be the individual. If a name is provided, reports may be addressed to the administrator by name.

AdministratorEmail The E-mail address to which alerts are sent to the administrator. If the field is empty no E-mails will be sent.

AdministratorTextMessage The text message address to which text messages are sent to the administrator. The field may be empty if alerts are to be sent to the E-mail address only. Both the AdministratorEmail and AdministratorTextMessage cannot be empty if a message is to be sent. The AdministratorTextMessage field is filled by the system from information provided by the administrator as to his or her cell telephone number and cell telephone service provider. If both an E-mail and text message address are provided, alerts will be sent through both channels unless the administrator indicates otherwise.

AdministratorReportChoice The rule applied to sending alerts to the administrator. Possible choices include daily, by minute barrier or never. AministratorReportChoice may be set to "on barrier" by default. The rule will be set to "never" if the member is the administrator and the member is also the only user to avoid duplicate alerts to the user.

ProviderId This identifies the administrator's cell telephone service provider.

CellPhone The cell telephone number of the account administrator. From the cell telephone number and the service provider, the system can determine the text message address for the administrator.

UserReportChoice Unless the administrator indicates otherwise, alerts may be sent to the user when 75%, 80%, 90% and 100% of the minute allowance has been used. It will be understood that these barriers are arbitrary and that reports could be sent at other levels of use if desired. In a commercial embodiment, the default in the minutes barrier is initially set to 75% of the user's allotted minutes. Other choices include daily and never.

Additional fields of information may be included in the member's record such as credit card information, billing address for credit card, payor's E-mail address if payor is not the administrator, password for account information, start date for service, end date for service, payment plan (i.e., individual, family, small business, large business, etc.) and so forth.

Figure 2:
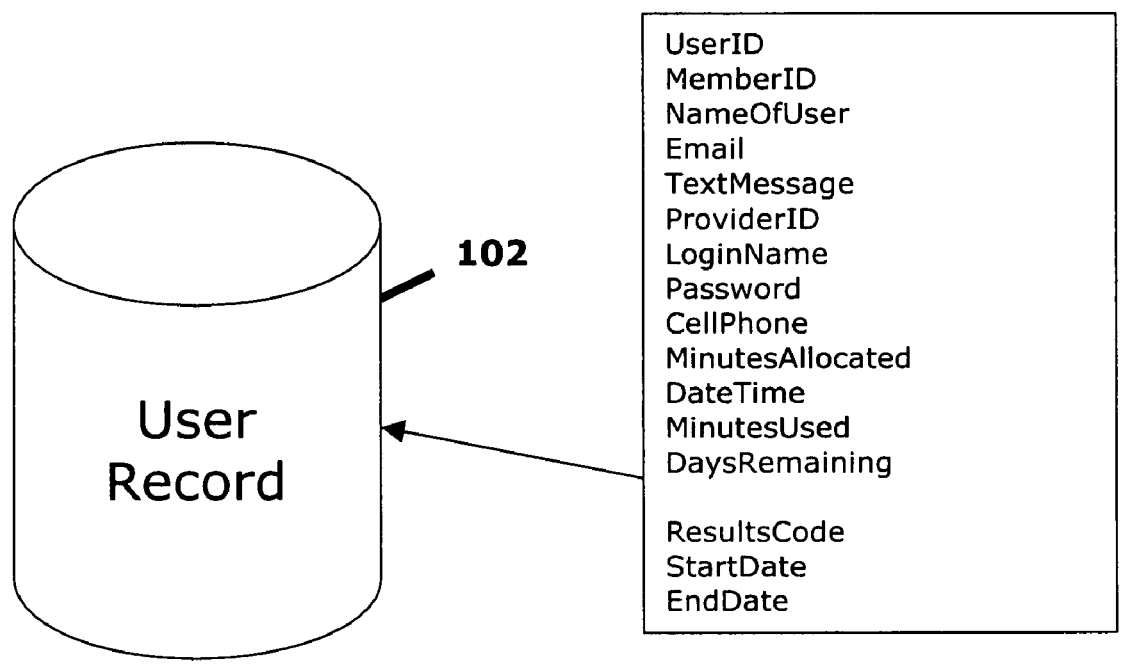
FIG. 2 is a simplified diagram of fields in a user's record in accordance with the present invention.

Referring now to FIG. 2, user information is displayed. Important user information includes the following fields:

UserID A unique user ID assigned to each user by the system. User data must be linked to member data through a member ID and user information cannot be entered until the member information has been entered. By linking each User ID to a member ID, the user records may be filtered and an administrative list compiled for each member as described hereinafter.

NameOfUser So that alerts may be addressed to the user by name. Email The E-mail address of the user to which alerts are to be sent. If the field is empty no E-mails will be sent.

TextMessage The text message address to which text message are to sent to the user. The field may be empty if alerts are to be sent to the E-mail address only.

Both the Email and text message fields cannot both be empty. The TextMessage field is filled by the system from information provided by the user as to his or her cell telephone number and cell telephone service provider.

ProviderID Name of user's cell telephone service provider.

Log-InName User name to access cell telephone account.

Password Password to access user's cell telephone account.

CellPhone Cell telephone number of the user.

MinutesAllotted The number of allotted minutes in the user's plan excluding off-peak minutes if not billed.

Date/Time This is the last date/time that the user's record was accessed. It may be initially set to the time the information was first entered into the record.

MinutesUsed Number of cell minutes used in plan to date. When the record is first set up, this field is empty.

DaysRemaining Number of days remaining until the minutes refresh. Initially this field is empty also.

Additional fields of information may be included such as a results code, a start date of the service, an end date, etc. The results code may link to another table as more particularly described below. If the member account has multiple users, a record is created with the above information for each user.

Figure 3:
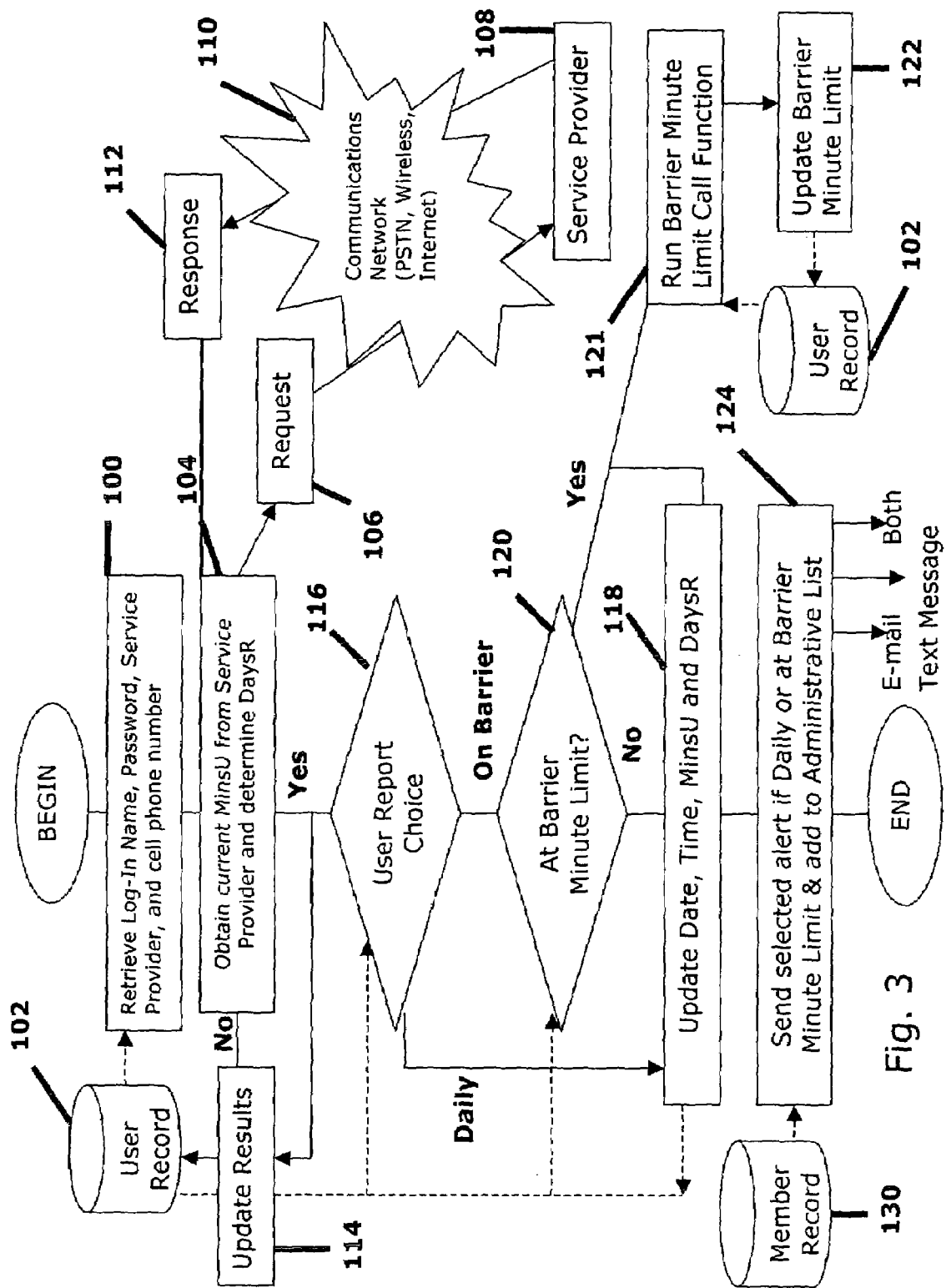
FIG. 3 is a simplified block diagram illustrating a method for tracking allotted wireless telephone minutes used and providing an alert to a user before overage charges are accrued.

Referring now to FIG. 3, after the member information and user information have been entered into the system, processing commences at 100 whereat a user record 102 is selected. Previously, the user records may be sorted such that the records are in reverse date order based on the Date/Time field and the oldest record is selected first. The user's telephone number, log-in name, password and provider information is read from the user's record. At 104 the system sends a request 106 to service provider 108 through communication network 110, such as Public Switched Telephone Network (PSTN), wireless network or the Internet. Service provider 108 receives request 106 and proceeds through an authorization sequence to ensure that the system is authorized to access the requested account. Request 106 therefore includes the log-in name and password for the account.

Service provider 108 provides a response 112 in reply to request 106 including the number of minutes used in the user's plan and the number of days remaining before the minutes refresh. If at 104 the system does not receive response 112 from service provider 108 with that information, following the "no branch" the system may code a results field at block 114 and update user's record 102. The results field may be linked to another table. For example a "1" in the results field may indicate that a response was received from the user's service provider, a "2" indicates that the user has provided a wrong log-in name or password and that notification has been sent to the user for corrected information, a "3" indicates that the service provider was unavailable for response, a "4" indicates that there was a processing error by the system, a "5" indicates that the user's account has been paused, a "6" indicates that the service has been purchased but credit card authorization is pending, a "7" indicates that the account has been set up but that the user has not been protected yet (after the first check the code is set to "1" and the user is sent a message that the service has started), and an "8" indicates that the service has expired.

Figures 5, 6:
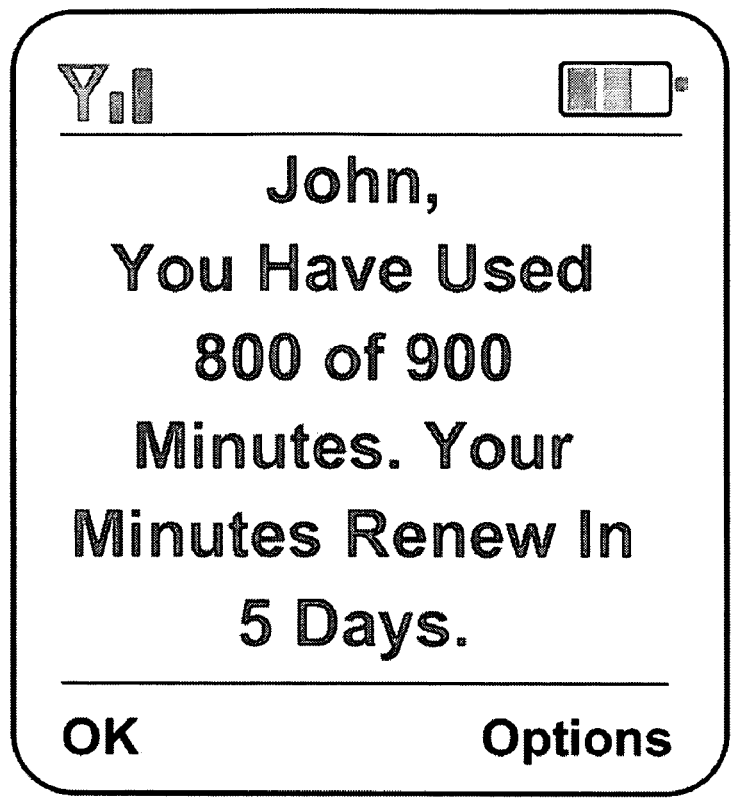
FIG. 5 is an example of a text message sent to a user informing him or her of number of minutes used under his or her wireless telephone service plan; and, FIG. 6 is an example of an e-mail message sent to an administrator of a member as to usage of allotted minutes for users associated with the member.

If at 104 the system receives response 112 from the service provider with minutes used and number of days to minutes refresh, following the "yes branch" the system changes the results code to "1" in 114 and updates user's record 102. A determination is made in block 116 as to circumstances under which the user wants a report sent. If the user wants daily alerts sent, processing passes to block 118. If the user wants alerts sent upon reaching barrier minutes of use, processing passes to block 120. In block 120, the number of minutes used is compared with the number of barrier minutes in the user's record 102, the default number may be 75% of the allotted number of minutes unless programmed otherwise. If the number of minutes used is smaller than the number of barrier minutes in the user's record, processing passes through "no branch" to block 118. Whereas if the number of minutes used is equal to or greater than the number of barrier minutes, processing passes through "yes branch" to 121 where a call function compares the number of minutes used with the number of minutes in levels 75%, 80%, 90% and 100% of allotted minutes and when the number of minutes matches a level, updates at 122 the barrier minutes in user's record 102. For example, if the number of minutes used is above 75% but below 80%, the system sets the barrier minutes to 80% of the allotted minutes and updates the barrier minutes field in the user's record 102 accordingly. Processing along "yes branch" passes to block 118. In block 118, the user's record 102 is updated with current date/time, minutes used and days to refresh information. Processing then passes to block 124. An alert message is sent to the member by E-mail, text message as shown in FIG. 5 or to both as indicated by the member in the user report choice field in member record 130. Once the user has reached 100% of usage minutes allotted, an alert message may be sent daily.

Figure 4:
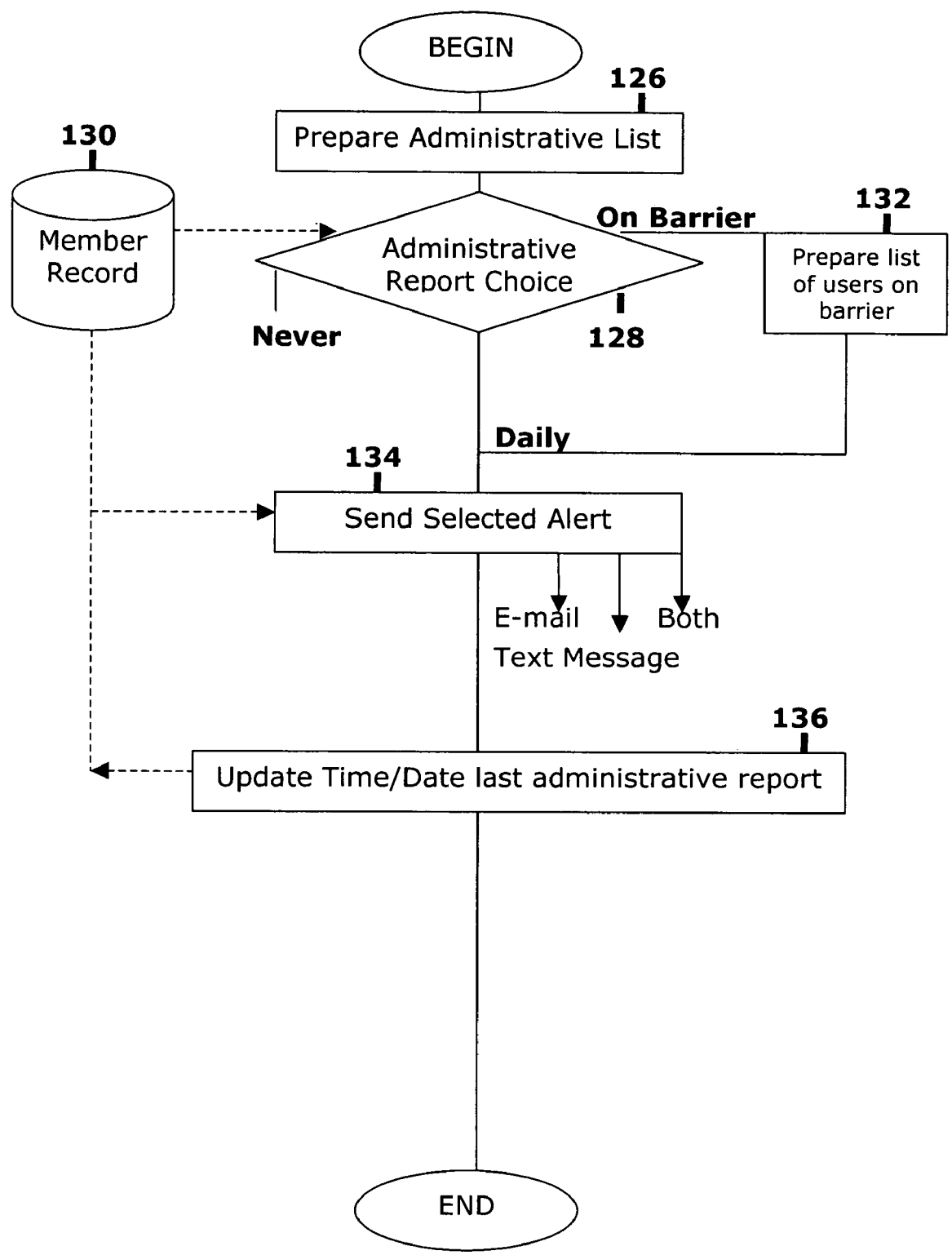
FIG. 4 is a simplified block diagram for providing an alert to an administrator of a member before overage charges are accrued for each user associated with the member.

Turning now to FIG. 4, an administrative list is prepared in block 126 for each member by filtering those user records for user IDs linked to the member ID. Processing passes to block 128 where the information is processed in accordance with the administrative report choice indicated in member's record 130. If the member is an individual, the choice is "never" otherwise the system would provide two reports to the user, one as "user" and the other as "administrator." If "on barrier" is selected, resulting at block 132 in the preparation of a list of users linked to the member's ID who passed over a barrier. A report is then sent in block 134 in accordance with the channels selected by the administrator of the account, either by e-mail as shown in FIG. 6, text message or both. The report may identify each user by his user name and provide number of minutes used, minutes allotted in plan and the number of days remaining until the minutes refresh. Processing passes to block 136 where a date/time field in the member's record may be updated.

While a particular sequence of events is described in FIGS. 3 and 4 with respect to updating user record 102 and member record 130, it will be apparent to those skilled in the art that the order in some instances is arbitrary and may be changed without effecting the overall operation of the system. For example in FIG. 4, block 136 is shown as following block 134. It should be apparent that block 134 may follow block 136 without effecting data processing.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed is:

1. A method for tracking allotted wireless telephone minutes used during a billing cycle and providing an alert before overage charges are accrued, said method comprising
    obtaining the number of metered usage minutes allotted under a user's wireless telephone plan from the user and storing them in a user's record;
    obtaining instructions from the user as to the reporting basis for alerts before overage charges are accrued during the billing cycle and storing the instructions in the user's record;
    retrieving usage minutes used and number of days until the minutes refresh from a user's wireless telephone service provider on a periodic basis during the billing cycle;
    comparing the usage minutes used during the billing cycle with the number of number of usage minutes allotted; and,
    sending an e-mail or text message to the user during the billing cycle before overage charges are accrued reporting the number of usage minutes used and the number of days until the minutes refresh on the basis selected by the user.

2. The method of claim 1 wherein the usage minutes used are retrieved from the user's wireless telephone service provider on a daily basis and reported to the user on the basis selected by the user.

3. The method of claim 2 wherein the user selects the reporting basis from the group consisting of daily and on barrier minutes used as a percentage of usage minutes allotted.

4. The method of claim 3 wherein the barrier minutes used are set at 75%, 80%, 90% and 100% of usage minutes allotted.

5. A method for tracking allotted cellular telephone minutes used during a billing cycle and providing an alert to a user and an account administrator for a member before overage charges are accrued, said method comprising
    associating the user with a member;

obtaining the number of metered usage minutes allotted under a user's cellular telephone plan, cellular telephone number, cellular service provider, log-in name and password from the user;

obtaining instructions from the user or account administrator as to the reporting basis for alerts before overage charges are accrued during the billing cycle;

retrieving usage minutes used and number of days until the minutes refresh from the user's cellular telephone service provider on a periodic basis during the billing cycle;

comparing the usage minutes used with the number of number of usage minutes allotted; and, sending an e-mail or text message to the user during the billing cycle before overage charges are accrued and to the account administrator for the member associated with the user and reporting the number of usage minutes used and the number of days until the minutes refresh on the basis selected by the user or account administrator.

6. The method of claim 5 wherein the usage minutes used are retrieved from the user's cellular telephone service provider on a daily basis and reported to the user and to the account administrator for the member on the basis selected by the user and by the account administrator for the member.

7. The method of claim 6 wherein the user and the account administrator for the member select the reporting basis from the group consisting of daily and on barrier minutes used as a percentage of usage minutes allotted.

8. The method of claim 7 wherein the barrier minutes used are set at 75%, 80%, 90% and 100% of usage minutes allotted.

9. A method for tracking allotted cellular telephone minutes used and providing an alert to a user and an account administrator for a member before overage charges are accrued, said method comprising assigning a member identification to a member and storing the member identification in a member record;

assigning a user identification to one or more users associated with the member and storing each user identification and the associated member identification in a user record;

obtaining from each user the number of metered usage minutes allotted under a user's cellular telephone plan, cellular telephone number, cellular service provider, log-in name and password from each user and storing them in the user record;

obtaining either an e-mail address or text messaging address from each user and from the account administration for the member and storing them in each user's record and the member's record respectively;

obtaining instructions from each user and from the account administrator for the member as to the reporting basis for alerts and storing the instructions in each user's record and the member's record respectively;

retrieving usage minutes used and number of days until the minutes refresh from each user's cellular telephone service provider on a periodic basis;

comparing the usage minutes used with the number of number of usage minutes allotted for each user;

sending an e-mail or text message alert to each user reporting the number of usage minutes used and the number of days until the minutes refresh on the basis selected by each user;

storing the date the usage information was retrieved in each user's record;

forming a list of users whose user identification is associated with the member identification; and, sending an e-mail or text message to the account administrator for the member with the list of users associated with the member identification on the basis selected by the member.

10. The method of claim 9 wherein the usage minutes used are retrieved from each user's cellular telephone service provider on a daily basis and the date the usage information was retrieved updated in each user's record.

11. The method of claim 10 wherein each user and the account administrator for the member select the reporting basis from the group consisting of daily and on barrier minutes used as a percentage of usage minutes allotted.

12. The method of claim 11 wherein the barrier minutes used are set at 75%, 80%, 90% and 100% of usage minutes allotted.

* * * * *